United States Patent [19]

Trentham et al.

[11] 4,387,037
[45] Jun. 7, 1983

[54] REMOVAL OF SULFUR FROM WASTE GAS STREAMS

[75] Inventors: H. Lee Trentham, Galveston; John H. Crow, Houston, both of Tex.; Farwell C. Boston, Shreveport, La.

[73] Assignee: Trentham Corporation, Houston, Tex.

[21] Appl. No.: 329,766

[22] Filed: Dec. 11, 1981

Related U.S. Application Data

[62] Division of Ser. No. 209,719, Nov. 24, 1980, Pat. No. 4,320,101.

[51] Int. Cl.³ ............... C01B 17/48; B01D 53/34
[52] U.S. Cl. ............................. 252/184; 423/243; 423/575; 252/364
[58] Field of Search ............. 252/184, 364; 423/243, 423/575

[56] References Cited

U.S. PATENT DOCUMENTS

| 3,620,674 | 4/1971 | Renault | 23/178 |
| 3,767,777 | 10/1973 | Frye et al. | 423/575 |
| 3,904,735 | 9/1975 | Atwood et al. | 423/243 |
| 4,110,087 | 8/1978 | Nolley, Jr. | 55/73 |
| 4,113,849 | 9/1978 | Atwood | 423/574 R |
| 4,140,751 | 2/1979 | Vasan | 423/243 |
| 4,170,628 | 10/1979 | Kosseim et al. | 423/243 |
| 4,203,953 | 5/1980 | Simoleit et al. | 423/575 |
| 4,222,993 | 9/1980 | Holter | 423/243 |

Primary Examiner—Irwin Gluck
Attorney, Agent, or Firm—Pravel, Gambrell, Hewitt, Kirk & Kimball

[57] ABSTRACT

Preferential sulfur dioxide absorption solvents may be buffered with suitable agents, such as alkanolaminium carboxylates, to substantially retard or eliminate the tendency of such solvents to degrade or accumulate non-regenerable salts, particularly sulfates, when loaded with absorbed sulfur dioxide. A method for employing the buffer as an immiscible aqueous phase as a separate trimming solvent to selectively absorb residual sulfur dioxide from a gas stream from which the bulk amount of sulfur dioxide is first removed by contact with a trialkyl phosphate solvent is disclosed. The method permits the trialkyl phosphate solvent to be regenerated and purged of salts at lower energy requirements.

18 Claims, 1 Drawing Figure

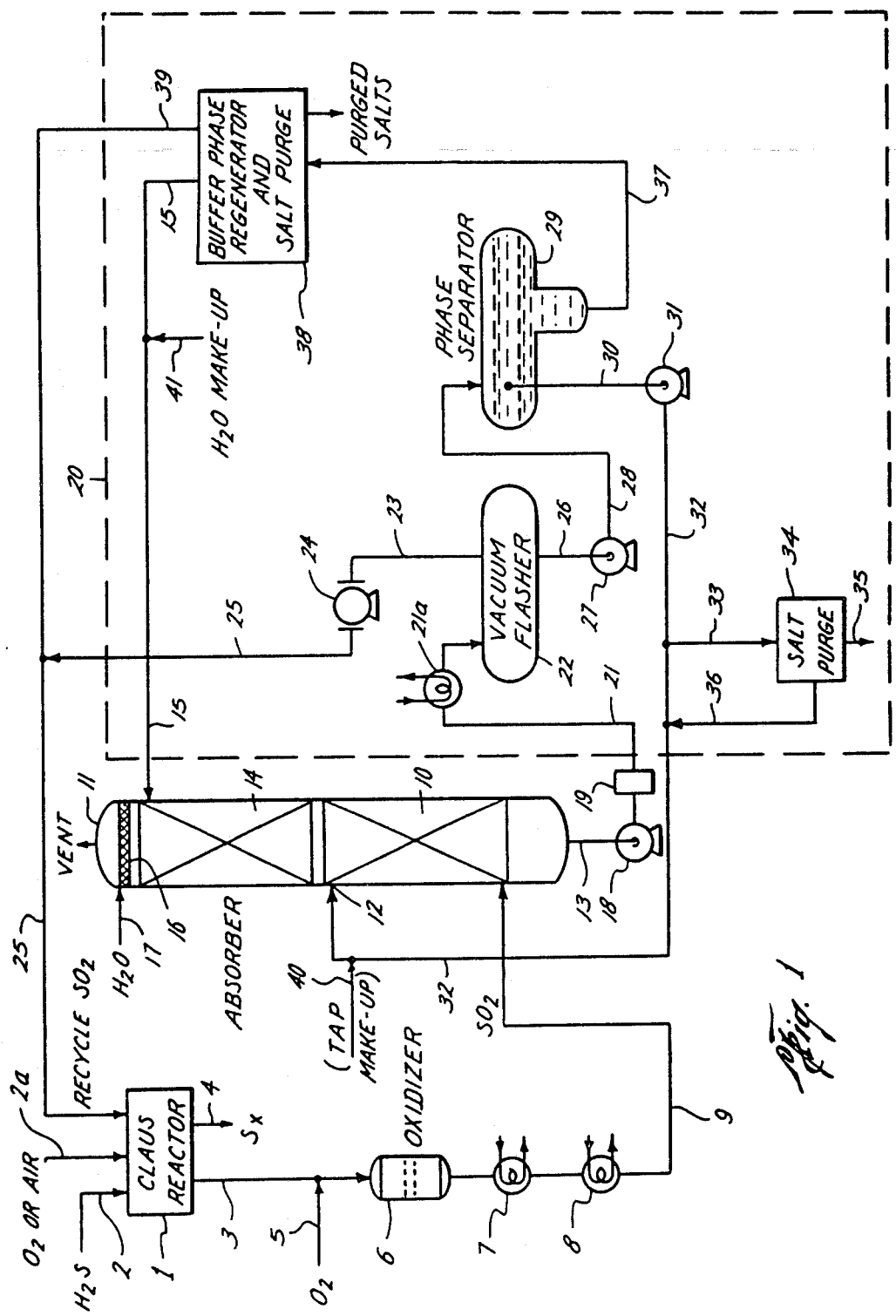

REMOVAL OF SULFUR FROM WASTE GAS STREAMS

This is a division of application Ser. No. 209,719, filed Nov. 24, 1980, now U.S. Pat. No. 4,320,101.

BACKGROUND OF THE INVENTION

Sulfur dioxide is a common contaminant of industrial plant vent gas streams and flue gases. It is also found in the vent gases from many ore smelting processes. The venting of gas streams containing sulfur dioxide to the atmosphere constitutes an undesirable pollution of the environment.

Various methods have been developed to reduce the emission of sulfur dioxide to the atmosphere and to recover the sulfur values thereof as elemental sulfur or other marketable sulfur products. One general method by which sulfur dioxide may be removed from a vent gas stream is by absorbing the sulfur dioxide in an absorption solution prior to venting the gas stream to the atosphere. Subsequently, the sulfur dioxide-loaded absorption solution may be regenerated to liberate a concentrated sulfur dioxide gas stream which is suitable for further treatment by known methods for the recovery of the sulfur values thereof as elemental sulfur, sulfuric acid as other marketable sulfur product. One such known method comprises the concentration of a dilute sulfur dioxide gas stream in an appropriate absorption-regeneration process to provide a concentrated sulfur dioxide gas stream suitable as feed to a Claus process for conversion to elemental sulfur.

In most instances industrial plant vent gases which contain sulfur dioxide also contain other acid gas components, especially carbon dioxide, from which it is desirable to separate sulfur dioxide prior to any further treatment process for the recovery of sulfur values. Carbon dioxide is a major diluent of flue and smelter off gases. Claus plant tail gases generally contain considerable quantities of carbon dioxide as well as sulfur dioxide. To be practical for removing sulfur dioxide and concentrating it for further treatment, a sulfur dioxide absorption process should be capable of preferentially absorbing sulfur dioxide in the presence of carbon dioxide.

Several absorption-regeneration processes for concentration of sulfur dioxide are known which employ various sulfur dioxide absorption solvents, such as solutions of sodium carbonate, sodium hydroxide, ammonium hydroxide, aqueous ammonia, disodium hydrogen phosphate, alkanolamines, trialkanolamines, and others. U.S. Pat. No. 3,904,735 discloses that aqueous trialkanolamines or tetrahydroxyalkyl alkylene diamines are selective sulfur dioxide absorption solvents. U.S. Pat. No. 3,767,777 discloses that a solvent comprising a water-soluble trialkyl phosphate containing at least about 5% water preferentially absorbs sulfur dioxide from a gas stream which also contains significant quantities of carbon dioxide.

Each of the above-described sulfur dioxide absorption solvents suffer from certain disadvantages which adversely effect their use in a commercial process. One disadvantage is that nonregenerable heat stable salts, particularly sulfate salts, accumulate in such solvents over prolonged periods of operation. To preserve the sulfur dioxide absorption capacity of such solvents, the accumulated heat stable salts, particularly the sulfates, must be purged from the system. A second disadvantage which pertains to the use of water-soluble trialkyl phosphates as a preferential sulfur dioxide absorption solution is their tendency to degrade during operation. Trialkyl phosphate (TAP) solvents which contain at least about 5% water have been found to degrade into other compounds which are not capable of sulfur dioxide absorption. For this reason, trialkyl phosphate solvents have not been widely employed in any commercial application for the removal of sulfur dioxide from industrial plant vent gas streams.

SUMMARY OF THE INVENTION

It has now been found that degradation of a TAP preferential sulfur dioxide absorption solvent over prolonged cycles of absorption and regeneration may be substantially reduced by addition thereto of suitable buffering agents in amounts sufficient to maintain the pH of a sulfur dioxide-loaded TAP solvent during the absorption-regeneration cycle above about pH 1.9, and preferably above about pH 2.3. The presence of a suitable buffer substantially reduces the tendency of a TAP solvent to decompose and also retards the rate at which nonregenerable sulfate salts are formed. Alkanolaminium carboxylate salts, alkali metal salts of $C_1$ to $C_4$ carboxylic acids and benzoic acid, and ammonium salts of $C_1$ to $C_4$ carboxylic acids and benzoic acid, have been found to be suitable buffering agents for TAP absorption solvents.

Such buffer are capable of maintaining the pH of a sulfur dioxide-loaded TAP solvent above its degradation point when the buffer is added to the extent of at least about two percent by weight, and preferably to about ten percent by weight or greater. It has been found however, that when added at amounts greater than about two percent by weight that such buffers are not completely miscible with a TAP solvent and will produce a solvent mixture comprising two aqueous phases. One aqueous phase is rich in TAP and contains only traces of buffer. The second aqueous phase is rich in buffer and contains only traces of TAP. The TAP-rich phase is significantly larger in volume than the buffer-rich phase.

Despite phase separation, it has been observed that the buffer—as a separate aqueous buffer-rich phase—is nevertheless capable of preventing degradation of the TAP phase provided that it is intermingled with the TAP phase during the process of sulfur dioxide absorption and regeneration.

The buffered water phase alone has been found to be a preferential absorption solvent for sulfur dioxide. When comingled with the TAP phase any nonregenerable sulfate salts which may have formed therein separate from the TAP phase to collect and concentrate predominately in the buffered water phase.

A method has been developed to utilize the two-phase characteristic of a buffered TAP solvent in conjunction with the discovery that the buffered water phase itself is a preferential sulfur dioxide solvent by which, in addition to reducing the tendency of TAP to decompose or for nonregenerable sulfate salts to form in the TAP solvent, the utility requirements for solvent regeneration and sulfate purging for a system employing such method may be substantially reduced. This novel method comprises contacting, preferably in countercurrent flow, in a first absorption zone a gas containing sulfur dioxide with a lean TAP solvent phase which absorbs the bulk amount of the sulfur dioxide from the gas, thereby forming a sulfur dioxide-rich TAP solvent phase; subsequently contacting the gas leaving the first zone with a lean buffered water phase in a second absorption zone to absorb residual sulfur dioxide from the gas, thereby forming a sulfur dioxide-rich buffered water phase; continuously mixing the rich buffered water phase from the second absorption zone with the TAP solvent phase in the first absorption zone and withdrawing the mixed phases from the first absorption zone; regenerating the TAP phase by vacuum flashing the mixed phases to liberate from the rich TAP phase a first concentrated sulfur dioxide gas stream, thereby forming a lean TAP phase; separating for return to the first absorption zone the lean TAP phase from the rich buffered water phase; regenerating the rich buffered water phase (such as by steam stripping) to liberate a second concentrated sulfur dioxide gas stream, thereby forming a lean buffered water phase; purging nonregenerable sulfate salts from the lean buffered water phase; and, returning the lean buffered water phase to the second absorption zone.

The buffered water phase from the second zone is continuously mixed or comingled with the TAP phase in the first zone during the absorption cycle and remains in admixture with the TAP phase during its regeneration, thereby continuously maintaining the pH of the sulfur dioxide-loaded TAP phase above that value at which TAP decomposes. Since the mixed phases comprise two distinct immiscible phases, the major volume TAP phase may be regenerated by vacuum flashing—typically at low heat loads such as 140° F. at from about 120 to about 130 mm Hg pressure—and thereafter the immiscible lean TAP phase may be readily separated from the still rich buffered water phase. Only the minor volume rich buffered water phase requires regeneration by distillation. Since the buffered water phase is of significantly smaller volume than the TAP phase this provides for significant reductions in distillation heat loads, and energy economies in the system. Additionally, the cost of purging the system of nonregenerable sulfates is greatly reduced since such sulfates continuously concentrate in the minor volume buffered water phase which may be treated with a minimal amount of lime or the like to purge the accumulated sulfates. Since the bulk quantity of sulfur dioxide is removed in the TAP phase and the sulfate purge is performed on the buffered water phase, consumption of lime or other chemicals necessary to purge sulfates is minimized.

BRIEF DESCRIPTION OF THE DRAWING

FIG. 1 is a flow diagram illustrating one embodiment of the novel method of this invention.

DESCRIPTION OF SPECIFIC EMBODIMENTS

The present invention is directed to the discovery of certain buffering agents which, when used in conjunction with a TAP sulfur dioxide absorption solvent, reduce or prevent the tendency of TAP to degrade or form nonregenerable sulfates when loaded with sulfur dioxide. The invention is further directed to a novel method of using a TAP solvent with such buffers for selectively absorbing sulfur dioxide which method prevents the accumulation of nonregenerable sulfates in the TAP solvent phase and permits the sulfur dioxide-loaded solvent to be regenerated and purged of nonregenerable sulfates at lower energy cost.

The water soluble trialkyl phosphates (TAP) suitable for use as selective sulfur dioxide absorption solvents are those wherein the alkyl groups have, independently, from one to four carbon atoms. The preferred trialkyl phosphate is triethyl phosphate (TEP). In order to facilitate the regeneration of a sulfur dioxide-loaded TAP solvent, it should preferably contain at least about 5% by weight water.

Trialkyl phosphates are highly selective solvents for sulfur dioxide absorption. Water is added to TAP solvents to permit the regeneration of a sulfur dioxide-rich TAP solvent at reasonably low temperatures, thus minimizing possible thermal degradation of the TAP. The exact water content of the TAP solvent may vary, depending upon the solvent regeneration method employed. Where regeneration is by distillation at least about 5% by weight water is required to lower the boiling point of the TAP to the point wherein steam may be used to boil the solvent for regeneration. Where vacuum flashing is employed for solvent regeneration from about 8 to about 30% by weight water is used, and it is preferred that the TAP solvent phase contains about 15% by weight water. As the water content increases the absorption capacity of a TAP solvent decreases. Therefore, although there is no precise upper limit on the amount of water the TAP solvent may contain, practically it should be limited to that amount necessary, under the conditions employed in the system in use, to provide for efficient solvent regeneration at reasonable temperatures while maintaining the solvent's absorption capacity at an acceptable level.

Although water is added to TAP solvents to provide for their regeneration at conditions which avoid thermal degradation of the trialkyl phosphate it has been found in practice that the presence of water may cause the TAP to undergo degradative hydrolysis during the sulfur dioxide absorption-regeneraton cycles. Degradative hydrolysis of an unbuffered TAP solvent may occur to such an extent as to make it undesirable for commercial applications.

Degradation of trialkyl phosphate solvents in the presence of water was found to be critically dependent upon the pH of the solvent during repetitive cycles of sulfur dioxide absorption-regeneration, with abrupt degradative hydrolysis occurring at pH values below about 1.1. It was also found that degradative hydrolysis can be substantially reduced provided that the trialkyl phosphate solution pH is maintained above at least about 1.9, or substantially eliminated at pH values above about 2.3 and more preferably 2.7.

During service in a sulfur dioxide removal process sulfuric acid and sulfate salts inevitably accumulate in trialkyl phosphate solvents, thus lowering the pH even of a sulfur dioxide-lean solvent toward and below the degradation point. And, of course, during those periods of a cycle wherein the TAP solvent phase is loaded with sulfur dioxide its pH is even lower. It has now been found that certain agents may be used in conjunction with a trialkyl phosphate solvent as a buffer to maintain its pH value, even when sulfur dioxide-rich during the absorption-regeneration cycle, above at least about 1.9, and preferably above 2.3 to thus reduce or eliminate degradative hydrolysis.

Agents which have been found to be suitable buffers for use with a TAP solvent include:

(1) Alkanolaminium carboxylate salts of the following general formula:

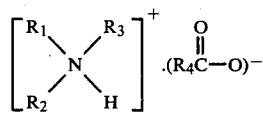

wherein R4 is a lower alkyl having from one to four carbon atoms and $R_1$, $R_2$ and $R_3$ each independently represents hydrogen or a lower alkyl or a hydroxyalkyl having from one to four carbon atoms.

(2) Alkali metal salts of carboxylic acids containing from 1 to 4 carbon atoms or of benzoic acid (3) Ammonium salts of carboxylic acids containing from 1 to 4 carbon atoms or of benzoic acid.

The preferred buffering agents are: (a) the 1:1 addition product of acetic acid and methyldiethanolamine, namely methyldiethanolaminium acetate (MDEAH-.AcO); (b) the 1:1 addition product of acetic acid and triethanolamine, namely triethanolaminium acetate (TEAH.AcO); (c) sodium acetate; (d) ammonium acetate; and (e) sodium benzoate. The most preferred buffers are methyldiethanolaminium acetate and triethanolaminium acetate.

Buffering agents, as described above, when comingled with a trialkyl phosphate solvent during the sulfur dioxide absorption-regeneration process maintain the TAP solvent pH above the degradation point. The miscibility of such buffers with acidified trialkyl phosphate solvents is limited and, although the precise amount of buffer which may be placed into homogeneous solution with a trialkyl phosphate solvent depends in part upon the particular buffer employed and the amount of water contained in the TAP solvent, generally no more than about 2.0% by weight of a buffer may be placed into homogeneous solution with a TAP solvent.

Although the addition of a buffer at concentrations of about 2.0% by weight into homogeneous solution with a trialkyl phosphate solvent significantly retards the rate at which such a solvent degrades in operation, it is preferred to include the buffer to an extent of about 10% by weight and preferably 15% by weight and to employ the thus buffered solvent as a two-phase solution. At buffer concentrations of about 10% by weight, the trialkyl phosphate solvent solution comprises two phases: a major volume TAP-rich aqueous phase and a minor volume buffer-rich aqueous phase. The buffer-rich aqueous phase contains the bulk of the buffering agent and has only traces of the trialkyl phosphate. The TAP-rich phase contains the bulk of the trialkyl phosphate with traces of the buffering agent. Yet, comingling the buffer-rich aqueous phase with the TAP-rich aqueous phase during the steps of $SO_2$ absorption and regeneration will maintain the pH of the TAP phase above the hydrolysis degradation point.

A two-phase TAP solvent buffered in the above manner will thus typically contain by weight percent about 60 to about 93% TAP, about 5 to about 30% water and about 2 to about 20% buffering agent.

Such buffered TAP solvents may be used in a conventional processing system comprising an absorption column and a stream stripper, such as is illustrated in U.S. Pat. No. 3,767,777, the disclosure of which is hereby incorporated by reference. The processing steps for such systems are well known and need no further discussion or description. The circulation of the two phases through the system keeps the phases intermingled sufficiently. The buffered solvents of this invention may be employed in such processes in like manner to non-buffered TAP solvents.

In the method of this invention, as illustrated in FIG. 1, the industrial vent gas stream which is shown as being treated by the inventive method is a Claus tail gas. Of course, it should be realized that a sulfur dioxide ($SO_2$) containing vent gas, such as the off gases from a smelter or the like may also be similarly treated.

With reference to FIG. 1, the process operates as follows: The industrial vent gas stream to be treated 3 is that produced by a Claus plant 1. A Claus plant produces elemental sulfur (Sx) by the following reaction:

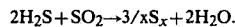

$$2H_2S + SO_2 \rightarrow 3/xS_x + 2H_2O.$$

The $SO_2$ required for the Claus reaction is typically produced by combusting a one-third portion of the hydrogen sulfide ($H_2S$) feed gas 2 with oxygen 2a. Elemental sulfur produced by the Claus reaction is removed from the gas stream by condensation 4. The oxygen for combustion may be pure oxygen, but more typically is obtained from the atmosphere, thus introducing atmospheric nitrogen as a diluent which ultimately passes through to the tail gas 3. Since the hydrogen sulfide feed gas 2 generally contains carbon dioxide as an inert, this too passes through the Claus plant and becomes a diluent of the tail gas 3. The Claus process cannot completely convert the sulfur values of the feed gas to element sulfur. Therefore, depending upon the number of catalytic stages contained in the Claus plant, anywhere from 20% down to about 3% of the sulfur values pass through the plant to the tail gas as $H_2S$ and $SO_2$. The tail gas may also contain minor amounts of carbonyl sulfide and carbon disulfide and traces of elemental sulfur. Thus, a typical Claus tail gas will contain the following components $N_2$, $H_2O$, $CO_2$, $H_2S$, $SO_2$, COS, $CS_2$, $S_x$ and other minor gas impurities.

Oxygen (or air) is added through line 5 to the tail gas in line 3 which is then introduced into a sulfur oxidizer 6 wherein all tail gas residual sulfur values are converted to sulfur dioxide. The gas stream is then passed to a waste heat recovery unit 7 and, if necessary, through a cooler 8 wherein it is cooled to a temperature suitable for sulfur dioxide absorption.

From cooler 8 the gas stream is passed by line 9 to the bottom, or lower portion of the first absorption zone 10, of absorption tower 11. A lean TAP solvent phase is admitted to the top portion 12 of the first absorption gas zone 10 by line 32. The TAP solvent passes downward while the gas stream passes upward through the first absorption zone 10 of tower 11 and countercurrent contact between the gas and TAP solvent occurs. During this countercurrent contact the bulk portion of the sulfur dioxide content is removed from the gas stream by absorption in the TAP solvent, thereby forming a $SO_2$-rich TAP solvent which accumulates in the bottom of tower 11 and is continuously withdrawn through line 13.

As the gas stream moves upward through and out of the first absorption zone 10 it passes to a second absorption zone 14 which, as illustrated, may be located in the upper portion of tower 11. A lean buffered water solution is admitted by line 15 to the upper portion of second absorption zone 14, which in FIG. 1 is the top portion of tower 11. The lean buffered water solution passes downward while the gas stream passes upward through second absorption zone 14. Countercurrent contact of the buffered water solution and the gas stream occurs whereby the residual sulfur dioxide content of the gas stream may be reduced to below about 100 ppm by absorption into and thus forming a $SO_2$-rich buffered water solution.

Since the TAP phase and buffered water phase are immiscible and, in the novel method of this invention, are separately circulated to the first and second absorption zones, respectively, the amount of buffering agent which will come into contact and mingle with the TAP phase in the first absorption zone is a function of the rate at which the buffered water phase is circulated to the second zone and the TAP phase is circulated to the first. The buffered water phase should be circulated to the second zone at a rate sufficient to produce a mixed phase solution (that is, a TAP, water, buffer mixture) wherein the buffering agent is always present in an amount of at least 2 wt.%, and preferably in an amount of 10 wt.% or greater. The circulation rates necessary to accomplish this may readily be determined by those of ordinary skill in the art in the course of designing a plant for installation.

The gas stream passing through second absorption zone 14, now essentially free of sulfur dioxide, is vented to the atmosphere and generally requires no further treatment in order to comply with pollution control standards. A mist pad 16 may be provided at the top of second absorption zone 14 to prevent carry over of solvent, TAP or buffered water, by the gas which is discharged. If desired, a water spray 17 may be provided to the mist pad to further reduce any solvent carry over which may occur and to recover any vaporized constituents from the buffer such as acetic acid which may be present in trace amounts due to the accumulation of small amounts of sulfuric acid forming sulfates in the system.

The $SO_2$-rich buffered water solution exiting the second absorption zone 14 is passed to the top of first absorption zone 10. Since, as illustrated in FIG. 1, the second zone is located in the same tower 11 and above the first zone 10 no separate piping or conduits are required. The $SO_2$-rich buffered water solution exits the second zone 14 and from there proceeds into and downward through the first zone 10. As the buffered water solution passes into and down through the first zone 10 it is continuously comingled with the TAP solvent phase circulated therethrough. Since the circulation of TAP and buffered water is continuous through zones 10 and 14 the buffered water solution is kept in continuous admixture with the TAP solvent in the first zone 10 during $SO_2$ absorption and, as will be discussed, during regeneration of the TAP solvent. Thus, even to the extent that the buffered water solution is present in an amount in excess of which it is capable of forming a homogeneous solution with the rich TAP solvent, it is still present in a sufficiently intermingled two phase mixture with the TAP solvent to maintain the pH of the TAP solvent phase above that point at which degradative hydrolysis occurs and thus provides additional buffering of the TAP solvent solution.

The buffered water solution accumulates in admixture with the TAP solvent phase in the bottom of tower 11, part in solution and part as an intermingled but immiscible phase with the TAP. The dual phase solution is withdrawn from tower 11 by line 13, and is passed by pump 18 through a filter 19 and line 21 to a regeneration unit 20 indicated by the dotted line in FIG. 1, wherein the rich buffered solvent is regenerated for further use and stripped $SO_2$ is separated as a concentrated gas stream for additional treatment or recycle to the Claus plant. A heat exchanger 21a is incorporated into line 21 by which the temperature of the solvent phases passed to regeneration unit 20 may be regulated, as necessary, to the optimum flashing temperature for regeneration.

The regeneration unit 20 illustrated in FIG. 1 is one wherein TAP is stripped by vacuum flashing. Of course, a system could be used wherein the dual phase mixture is regenerated in a conventional distillation stripper following which the phases may be separated in a separator to provide a separate TAP phase and buffered water phase (to be purged of sulfates) which phases are returned to a first and second absorption zone as discussed above. The plant configuration necessary for conventional distillation stripping of a dual phase buffered mixture of TAP is well within the skill of an ordinary engineer in this art and needs no further description. However, FIG. 1 illustrates a preferred embodiment wherein, for purposes which will become evident, the TAP phase and the buffered water phase are separately regenerated, with vacuum regeneration being employed for the TAP phase.

After withdrawal from tower 11, the comingled solvent phases are passed by line 21 to a vacuum flashing regenerator 22. The vacuum flash may be operated at temperatures of from about 130° to about 212° F. and at absolute pressures from about 110 to about 360 mm Hg absolute. A TAP-rich phase of the solvent having a water content of from about 8 to about 30% by weight is easily regenerated at such conditions. The presence of an intermingled buffered water phase does not interfere with regeneration of TAP in this manner. TAP degradative hydrolysis is substantially avoided for two reasons. First, the presence of an intermingled buffer phase during regeneration maintains the pH of the $SO_2$-rich TAP above about 1.9 during regeneration. Second, regeneration is accomplished at lower temperatures than required for distillation regeneration, thus lowering the rate of any thermal degradative reaction the TAP may undergo even in the presence of the buffering agent.

Although the $SO_2$ absorption capacity of a TAP solvent which preferably contains about 15% by weight water, in order to permit ready regeneration thereof by vacuum flashing, is lower than that of TAP solution containing less water, inordinate quantities and circulation rates of TAP through zone 10 of absorption tower 11 are not required since the buffered water phase is used as a trimming absorption solvent in the second zone 14 of tower 11 to remove residual $SO_2$ passing with the gas stream through the TAP absorption zone (first zone) 10.

$SO_2$ which separates under vacuum flashing from the TAP phase in vacuum flasher 22 passes through line 23 and pump 24, which pump creates the vacuum for the vacuum flasher 22, into line 25 from which it is passed to further processing to recover its sulfur values. As illustrated in FIG. 1, it is recycled by line 25 back to Claus plant 1.

After regeneration of the TAP phase in vacuum flasher 22, the intermingled dual phase mixture is passed therefrom by line 26, pump 27, and line 28 to phase separator 29 where the immiscible lean TAP phase and rich buffered water phase are allowed to separate. THe separated lean TAP phase is removed from separator 29 by line 30, pump 31 and is returned by line 32 back to tower 11 where it is admitted to the top portion 12 of the first absorption zone 10.

A take off line 33 may be added to TAP return line 32 by which a portion of the recirculated TAP may be periodically or continuously diverted to purifier 34 to purge heat stable salts 35 which may have accumulated in the solution. After the salt removal, TAP is returned from purifier 34 by line 36 to return line 32. As previously discussed, most of the heat stable salts that form in the TAP solvent are continuously removed therefrom and concentrate in the buffered water solution. Therefore the purge loop, 33, 34, 36 appendant to return line 32 would not require frequent operation. Purification may be by treatment with soda ash, lime or in any of the other known manners for purging heat stable salts from an absorption solution. Such methods are known to those of ordinary skill in the art and do not therefore require further discussion.

Although some $SO_2$ may be removed from the buffered water phase during vacuum stripping, it nevertheless retains enough $SO_2$ after passing through vacuum flasher 22 to require further stripping. Therefore, the $SO_2$-rich buffered water phase separated in separator 29 passes by line 37 to a distillation regenerator tower and heat stable salt purger, schematic illustrated as 38, wherein it is stripped of $SO_2$. The regeneration of the $SO_2$-rich buffered water phase may easily be accomplished by steam stripping. The resulting lean buffered water solution may be purged of accumulated sulfates by lime addition treatment or passage over an ion-exchange resin or other suitable means, and the solution returned by line 15 to the second absorption zone 14 of tower 11. Stripped $SO_2$ is passed by line 39 to a process for sulfur value recovery. As illustrated the $SO_2$ in line 39 as well as that in line 25 are recycled to the Claus unit 1 for recovery as elemental sulfur.

As needed for make up for solvent losses, fresh TAP solvent may be added to the system at line 40 and fresh buffer or make up water may be added at line 41.

The buffering effect on TAP solvents is illustrated as follows:

EXAMPLE 1

A buffered solution of triethyl phosphate was prepared, with ammonium benzoate as the buffering agent, and acidified with $H_2SO_4$. The final solution comprised by weight percent ammonium benzoate 6.78%, $H_2SO_4$ 4.74%, water 13.04%, and triethyl phosphate 75.44%. The pH of the above solution was determined as pH 1.3 even though $H_2SO_4$ was present in an excess approximately 100% beyond that of equivalence with ammonium benzoate and at full ionization would have produced a solution having a calculated pH of 0.36. The ammonium benzoate buffer produced an approximately 8.7 fold reduction of the solution's actual acid strength.

The above solution was placed in a stainless steel equilibrium vessel to which a gas stream containing $SO_2$ was supplied and its capacity for $SO_2$ absorption determined. Equilibrium with $SO_2$ gave the following results:

| TEMP., °F. | PARTIAL PRESSURE $SO_2$, psia | SOLUBILITY, SCF/U.S. GAL. | TOTAL PRESSURE, psia |
|---|---|---|---|
| 80 | 0.770 | 0.91 | 27.7 |
| 200 | 5.66 | 0.67 | 41.2 |

EXAMPLE 2

A solution of triethyl phosphate buffered with ammonium acetate was prepared in the following weight percent proportions, ammonium acetate 5.16%, water 17.84% and triethyl phosphate 77.00%. The solution had an initial pH of 7.0. The effect of $H_2SO_4$ addition on solution pH was tested by titration with 95% $H_2SO_4$, with the amount of added $H_2SO_4$ being calculated as a weight percent of the total solution. The following values were obtained:

| $H_2SO_4$ wt. % | pH at 77° F. |
|---|---|
| 0 | 7.0 |
| 0.166 | 6.9 |
| 0.33 | 6.74 |
| 0.66 | 6.48 |
| 0.82 | 6.29 |
| 1.02 | 6.1 |
| 1.21 | 5.87 |
| 1.38 | 5.41 |
| 1.57 | 2.88 |

The acidified solution was then placed in a stainless steel equilibrium vessel dosed with $SO_2$ and air and the vessel closed and the solution refluxed for 120 hours at 230° F. Thereafter an $SO_2$ vapor-liquid equilibrium test was run on the solution at 23.3 psia at 100° F. giving the following results:

$SO_2$ partial pressure was 29.2 mm Hg, $SO_2$ solubility was 0.87 SCF/Cu.Ft., and solution pH was 1.16. Ethyl ether and ethyl alcohol were detected in the solution indicating that some triethyl phosphate had undergone some degradative hydrolysis.

EXAMPLE 3

In a manner similar to Example 2, another triethyl phosphate solution was prepared with ammonium benzoate as the buffering agent in the following weight percentages; ammonium benzoate 11.45%, water 22.23%, TEP 64.30% and $H_2SO_4$ 2.02% resulting in a solution pH of 6.3 at 77° F. The acidified solution was refluxed in a closed stainless steel equilibrium vessel for 120 hours at 230° F. with 13.7 mm Hg partial pressure of $SO_2$ and the balance air. Upon conclusion of refluxing, an $SO_2$ vapor-liquid equilibrium was run on this solution at 23.3 psia and 100° F. and the following results obtained:

$SO_2$ solubility was 0.158 SCF/Gal., and solution pH was 1.9. Only traces of ethyl ether and ethanol were observed indicating that TEP had, even in the presence of refluxing heat and acidity, undergone only slight degradative hydrolysis. The solution capacity for $SO_2$ was approximately the same for a fresh TEP solution containing an equivalent mole fraction of TEP.

Comparison of Examples 2 and 3 illustrates that there exists a solution pH value below which (approximately 1.2) degradative hydrolysis is abruptly accelerated. The examples also illustrate that degradative hydrolysis may be substantially reduced by incorporation of a suitable buffering agent in amounts sufficient to keep the solution pH above about 1.2.

The following examples illustrate the effect of differing amounts of buffer upon the rate of TEP degradation.

EXAMPLE 4

A TEP-water solution was prepared, with sodium acetate as the buffer, having the followng composition: sodium acetate 2.05 wt.%, water 10.26 wt.% and TEP 87.69 wt.%. The solution was presaturated with 1.62 SCF of $SO_2$ per gallon of solution and was a single homogeneous phase having a pH of 2.0 at 80° F. The solution was placed in a closed stainless steel vessel and refluxed for 87 hours at approximately 250° F. The vapor pressure of the vessel was monitored and the change of pressure with time was recorded as an indication of the rate at which TEP hydrolyzed to ether and ethanol. At the end of 87 hours, refluxing was discontinued and the solution analyzed. Approximately 10% of the TEP had been converted to ether and ethanol. Pressure observations revealed that the hydrolysis rate increase exponentially with time.

EXAMPLE 5

A second TEP-water solution was prepared with sodium acetate as the buffer in the following proportions: sodium acetate 10.08 wt.%, water 12.29 wt.% and TEP 77.63 wt.%. This buffering concentration resulted in the formation of a two-phase mixture having a pH of 6.3 at 80° F.; a TEP-rich phase comprising about 88.2 percent by volume of the total solution and a buffer-rich aqueous phase comprising about 11.8 volume percent. The two-phase solution was presaturated with 1.6 SCF of $SO_2$ per gallon of solution and refluxed under the same conditions as Example 4 for a period of 419 hours. The final solution had a pH of 1.65 at 80° F., constituted a single phase and upon analysis revealed that only approximately 8% of the TEP had been converted to ether and ethanol. $SO_2$ equilibrium test on the final solution at 83° F. showed it to have essentially the same absorption capacity for $SO_2$ as did a fresh solution having the same mole fraction of TEP.

A comparison of Examples 4 and 5 indicates that the stability of a TEP solvent against degradative hydrolysis may be significantly increased by increasing the buffer content from about 2.0% by weight to about 10% by weight. The TEP solution with 10% by weight sodium acetate as a buffer was approximately 4.8 times as resistent to hydrolysis as the one containing only 2% by weight buffer.

The following example illustrates that an aqueous solution of the buffering agent alone is effective as a selective absorbent for $SO_2$.

EXAMPLE 6

Four buffered aqueous solutions were prepared, one containing 15 wt.% sodium acetate and the others 3, 10 and 66.3 wt.% of 1:1 addition product of acetic acid and methyldiethanol amine. Each buffer solution was employed in a pilot plant comprising an absorption column and steam stripper of conventional arrangement and tested for $SO_2$ absorption with the following results, at the conditions indicated. Samples B, C, E, G, I, J and L of Example 6 contained $CO_2$ in the inlet gas stream in addition to $SO_2$, air and water vapor. The absorption data for these samples demonstrate that sodium acetate and methyldiethanolaminium acetate are highly selective absorption solvents for $SO_2$ in preference to $CO_2$ over a wide range of solvent loading, circulation rates and absorption temperatures.

| TYPE OF BUFFER | APPROXIMATELY 15 WT. % SODIUM ACETATE IN WATER | | | |
|---|---|---|---|---|
| Test No. | A | B | C | D |
| Regeneration (Stripping) Temp., °F. | 225 | 227 | 225 | 225 |
| Absorption Temp., °F. | 102 | 105 | 92 | 90 |
| pH, Lean Sol'n | 4.3 | — | 4.9 | 4.9 |
| pH, Rich Sol'n | — | — | 2.8 | 2.8 |
| Liquid Flow, Gal/Hr | 1.1 | 2.52 | .50 | .94 |
| Inlet Gas, SCF/Hr | 13.7 | 13.7 | 14.2 | 11.2 |
| Circulation, Gal/SCF | .080 | .184 | .035 | .084 |
| Inlet Gas Mole % Composition Inlet Gas: | | | | |
| Air & $H_2O$ | 97.22 | 35.4 | 81.25 | 92.93 |
| $CO_2$ | — | 24.1 | 3.95 | — |
| $SO_2$ | 2.78 | 40.5 | 8.8 | 7.07 |
| Mole % Composition Outlet Gas: | | | | |
| Air & $H_2O$ | 100 | 75.0 | 96.05 | 99.9 |
| $CO_2$ | — | 25.0 | 3.95 | — |
| $SO_2$ | NIL | NIL | NIL | .0935 |
| Solvent Loading SCF $SO_2$/Gal of Solvent (Net) | 0.35 | 2.21 | 2.49 | 0.83 |
| Percent of Inlet $SO_2$ Absorbed | 100 | 100 | 100 | 98.8 |
| Percent of Inlet $CO_2$ Absorbed (Calc.) | — | 25 | 15.4 | — |

| TYPE OF BUFFER | APPROX. 15 WT. % SODIUM ACETATE IN WATER | | 3 WT. % METHYL-DIETHANOLA-MINIUM ACETATE (MDEAH.AcO) 97% $H_2O$ | |
|---|---|---|---|---|
| Test No. | E | F | G | H |
| Regeneration (Stripping) Temp., °F. | 220 | 218 | 220 | 219 |
| Absorption Temp., °F. | 84 | 80 | 80 | 81 |
| pH, Lean Sol'n | 2.8 | 2.6 | 4.0 | 4.0 |
| pH, Rich Sol'n | — | — | 2.0 | 2.0 |
| Liquid Flow, Gal/Hr | 0.46 | 0.38 | 1.57 | 3.15 |
| Inlet Gas, SCF/Hr | 10.9 | 20.9 | 13.3 | 9.4 |
| Circulation, Gal/SCF | 0.042 | 0.018 | 0.118 | 0.334 |
| Inlet Gas Mole % Composition Inlet Gas: | | | | |
| Air & $H_2O$ | 77.66 | 91.94 | 90.16 | 80.65 |
| $CO_2$ | 3.59 | — | 0.16 | — |
| $SO_2$ | 18.75 | 8.06 | 9.68 | 19.35 |
| Mole % Composition Outlet Gas: | | | | |
| Air & $H_2O$ | 90.53 | 93.28 | 92.73 | 96.98 |
| $CO_2$ | 4.38 | — | 0.16 | — |
| $SO_2$ | 5.09 | 6.72 | 7.11 | 3.02 |
| Solvent Loading SCF $SO_2$/Gal of Solvent (Net) | 3.41 | 0.80 | 0.575 | 0.50 |
| Percent of Inlet $SO_2$ Absorbed | 76.8 | 18.0 | 70.1 | 86.6 |
| Percent of Inlet $CO_2$ Absorbed, (Calc.) | — | — | 4.7 | — |

| TYPE OF BUFFER | 3 WT. % MDEAH.AcO 97% H₂O | 10 WT. % MDEAH.AcO 90% H₂O | | |
|---|---|---|---|---|
| Test No. | I | J | K | L |
| Regeneration (Stripping) Temp., °F. | 218 | 217 | 216 | 222 |
| Absorption Temp., °F. | 79 | 82 | 83 | 83 |
| pH, Lean Sol'n | 3.3 | 4.1 | 3.5 | 4.0 |
| pH, Rich Sol'n | 2.2 | 2.6 | 2.4 | 2.0 |
| Liquid Flow, Gal/Hr | .41 | 1.10 | 1.04 | 1.10 |
| Inlet Gas, SCF/Hr | 7.07 | 6.1 | 12.4 | 12.7 |
| Circulation, Gal/SCF Inlet Gas | .058 | .180 | .084 | .087 |
| Mole % Composition Inlet Gas: | | | | |
| Air & H₂O | 95.56 | 95.3 | 91.57 | 94.4 |
| CO₂ | 1.42 | 1.25 | — | .20 |
| SO₂ | 3.02 | 3.45 | 8.43 | 5.40 |
| Mole % Composition Outlet Gas: | | | | |
| Air & H₂O | 97.9 | 98.75 | 97.9 | 99.8 |
| CO₂ | 1.39 | 1.25 | — | .20 |
| SO₂ | 0.71 | NIL | 2.10 | NIL |
| Solvent Loading SCF SO₂/Gal of Solvent (Net) | 0.40 | 0.192 | 0.77 | 0.62 |
| Percent of Inlet SO₂ Absorbed | 76.8 | 100 | 76.6 | 100 |
| Percent of Inlet CO₂ Absorbed, (Calc.) | 4.3 | 3.5 | — | 5.4 |

| TYPE OF BUFFER | 66.3 WT. % MDEAH.AcO 33.7 WT. % WATER | | |
|---|---|---|---|
| Test No. | M | N | O |
| Regeneration (Stripping) Temp., °F. | 230 | 228 | 228 |
| Absorption Temp., °F. | 95 | 89 | 89 |
| pH, Lean Sol'n | 5.2 | 5.25 | 5.3 |
| pH, Rich Sol'n | 3.3 | 4.9 | 4.9 |
| Liquid Flow, Gal/Hr | 0.63 | 0.32 | 0.32 |
| Inlet Gas, SCF/Hr | 11.9 | 10.7 | 10.7 |
| Circulation, Gal/SCF Inlet Gas | 0.053 | 0.0294 | .0294 |
| Mole % Composition Inlet Gas: | | | |
| Air & H₂O | — | — | — |
| CO₂ | — | — | — |
| SO₂ | 23.7 | 1.62 | 1.14 |
| Mole % Composition Outlet Gas: | | | |
| Air & H₂O | — | — | — |
| CO₂ | — | — | — |
| SO₂ | 0.079 | 0.07 | 0.04 |
| Solvent Loading SCF SO₂/Gal of Solvent (Net) | 4.46 | 0.522 | 0.368 |
| Percent of Inlet SO₂ Absorbed | 99.7 | 96.3 | 96.5 |
| Normality, as SO₃⁼, | | | |
| Lean Sol'n | 1.03 | 0.69 | 0.69 |
| Rich Sol'n | 1.70 | 1.07 | 1.07 |

Examples 7, 8 and 9 illustrate the rate of oxidation of absorbed sulfur dioxide, measured as sulfite, to sulfate. Three solutions were tested; one being 35 wt.% MDEAH.AcO and 65 wt.% water; a second being 33 wt.% MDEAH.AcO, 61.3 wt.% water and 5.7 wt.% TEP; and the third 9.5 wt.% sodium sulfite in 90.5 wt.% water as a control sample to compare against the buffered solutions.

EXAMPLE 7

A solution of MDEAH.AcO 35 wt.% and water 65 wt.% was placed in a stainless steel vessel inside a thermostatically controlled oven at 120° F. and bubbled with air after introduction of $SO_2$ into the solution to make it 1.5 N $SO_3^=$. The rate of air bubbling through a fritted bubbler was approximately 0.85 SCF/hr such that agitation was maintained with essentially a constant partial pressure of oxygen close to 3 psi. The vessel was approximately 60% full of liquid, starting out with about 290 cc of total liquid. The vapor exit was monitored and found to contain negligible amounts of $SO_2$. The liquid was sampled periodically and was analysed for both sulfite and sulfate, using iodine for the sulfite and barium ppt. weighing for the sulfate, with the following results:

| Elapsed Time, Hours | pH | Normalities in solution | |
|---|---|---|---|
| | | $SO_3^=$ | $SO_4^=$ |
| Start | 5.3 | 1.50 | 0 |
| 2.45 | 5.1 | | .304 |
| 7.17 | 5.0 | 1.09 | .668 |
| 16.3 | 4.9 | .076 | 1.57 |

(Approximate 10% volume loss due to evaporation.)

EXAMPLE 8

A solution comprising 33 wt.% MDEAH.AcO, 61.3 wt.% water and 5.7 wt.% TEP was placed in a stainless steel vessel and $SO_2$ was added to make it 1.77 N $SO_3^=$. It was bubbled with air under the same conditions as Example 7 and monitored for sulfite and sulfate content with the following results:

| Elapsed Time, Hrs. | pH | N, $SO_3^=$ | N, $SO_4^=$ |
|---|---|---|---|
| Start | 5.0 | 1.77 | .088 |
| 1.1 | 5.0 | 1.57 | .266 |
| 5.3 | 4.9 | 1.18 | .677 |
| 9.0 | 4.7 | .72 | 1.21 |
| 20.4 | 4.6 | .04 | 1.82 |

(Approximately 10% volume loss due to evaporation.)

EXAMPLE 9

A solution of 9.5 wt.% sodium sulfite in 90.5 wt.% water was bubbled with air under the same conditions as in Example 7 and the sulfite and sulfate content monitored with the following results:

| Elapsed Time, Hrs. | pH | N, $SO_3^=$ | N, $SO_4^=$ |
|---|---|---|---|
| Start | 6.8 | 1.65 | .06 |
| 1.75 | — | 1.65 | — |
| 5.0 | 5.45 | .51 | 1.03 |
| 8.25 | 3.3 | .092 | 1.17 |

(Some $SO_2$ stripped out.)

Examples 7, 8 and 9 show that the most rapidly oxidized material was unbuffered sodium sulfite. The unbuffered sulfite solution oxidized to sulfate at about twice the rate of sulfite in the solutions using the acetate ion in the buffering system. In addition in the unbuffered sulfite solution, at values below pH#5, $SO_2$ began to strip out. No $SO_2$ stripping was observed in solutions containing the acetate buffer. The acetate buffered solutions therefore appear to work much better than the unbuffered sodium sulfite solutions presently used in some commercial processes.

Example 10 illustrates the regeneration behavior of a mixed phase solution of TEP buffered with sodium acetate when submitted to vacuum flashing.

EXAMPLE 10

A master solution of 55.98 wt.% TEP, 10 wt.% sodium acetate and 34.02 wt.% water was prepared: 100 grams of this 10 wt.% (overall) sodium acetate buffered mixture with TEP and water formed a total volume of 92 c.c. which, upon mixing, followed by settling separated into 62.5 c.c. of TEP-rich phase and 29.5 c.c. of buffer water phase. A proportional fraction of each phase was removed and loaded with $SO_2$ by bubbling through the two phases in agitation. Each phase was analyzed for $SO_2$ content and then both were intermingled and subjected to vacuum flash stripping at an absolute pressure of 120–130 mm Hg. at 140° F. with results as reported as sample P in the table below.

A second two-phase solvent sample, sample Q, was prepared and submitted to vacuum flash stripping under the same conditions as sample P. Sample Q was prepared to determine the effect of additional water dilution upon the vacuum stripping of a mixed solvent. Sample Q was prepared by taking from the master solution 13.5 c.c of the 1.15 Sp. gravity buffered water phase (containing 10.95 grams water and 4.58 grams sodium acetate) and 28.00 c.c. of the TEP phase (containing 4.59 grams water and 25.43 grams TEP) and adding a total of 15 c.c. of water to the combined phases to form an overall composition having 8.18 wt.% sodium acetate, 46.37 wt.% water, and 45.45 wt.% TEP. This mixture was then allowed to redistribute and formed 23 c.c. of buffered water phase and 33.5 c.c. of TEP phase, the composition of each phase of which is reported in the following table as sample Q.

DETAILS OF RESULT OF TESTS ON SAMPLES P AND Q

| Sample | Phase | Weight Percent | | | SCF $SO_2$/Gallon | | % Flashed |
|---|---|---|---|---|---|---|---|
| | | $H_2O$ | Sodium Acetate | TEP | Before | After | |
| P | Buffer Water Phase | 70.5 | 29.5 | Trace | 6.61 | 4.72 (pH 4.6) | 28.6 |
| | TEP Phase | 15.3 | Trace | 84.7 | 1.12 | 0.32 | 71.4 |
| Q | Buffer Water Phase | 81.7 | 18.3 | Trace | 5.74 (pH 2.8) | 3.62 (pH 4.4) | 36.9 |
| | TEP Phase | 28.41 | Trace | 71.59 | 1.31 (pH 3.1) | .389 (pH 4.3) | 70.3 |

With $SO_2$ loading in each phase ranging from 1.12 to 6.61 SCF $SO_2$/gallon, the pH values varied from 2.8 to 4.6 for the flashed phases. It was found that the buffered water phases flashed only partially while the TEP phases flashed predictably. Over 70% of the absorbed $SO_2$ could be flashed from the TEP phases even when such phases contained as little as 15.3 wt.% water. The rich buffered water phase can, depending upon water content, be partially flash regenerated to the extent of about 30 to about 40%.

Although it is preferred that the buffered water phase be regenerated to a greater extent, hence requiring a subsequent stripping step, nevertheless it can still be reused as an effective triming solvent and buffering agent after partial regeneration in the vacuum flasher. In such cases, if desired, the partially regenerated buffered water phase, after separation from the TAP phase in separator 29, may then be returned to the upper portion of the second absorption zone 14 of tower 11 without being further regenerated. Or, if desired, to further reduce the energy requirements of the system, the partially regenerated buffered water phase may be divided into portions, one of which is further regenerated by steam stripping and purged of non-regenerable salts then combined with the second portion for return to the second absorption zone 14 of tower 11.

EXAMPLE 11

A solution was prepared containing 13.15 wt.% MDEAH.AcO, 67.49 wt.% TEP, 16.77 wt.% water, 1.88 wt.% $SO_2$ and 0.72 wt.% $H_2SO_4$. This solution conveniently separated into two phases having the following composition and properties:

| | TEP Phase | Buffered Water Phase |
|---|---|---|
| Vol. | 84.84 | 15.16 |
| Sp. Gr. | 1.081 | 1.188 |
| pH (25° C.) | 5.9 | 5.9 |
| Normality ($SO_3^=$) | .121 | 3.23 |

The vapor liquid equilibrium of $SO_2$ (mixed with helium) was then determined for each phase at 130° F. under non-oxidizing conditions. The following results were obtained:

| | $SO_2$ Content in Phases | | | | |
|---|---|---|---|---|---|
| | TEP Phase | | Buffered Water Phase | | |
| P.P. $SO_2$, psia | Normality | SCF/Gal | Normality | SCF/Gal | pH |
| Trace (Nil) | .171 | .271 | 3.23 | 5.11 | 5.9 |
| .302 | .213 | .337 | 3.16 | 5.16 | — |
| 2.18 | .718 | 1.14 | 3.70 | 5.85 | 3.8 |
| 4.71 | 1.088 | 1.72 | 3.85 | 6.03 | 3.1 |

(Normality is equivalent of $SO_3^=$ per liter even though some may be dissolved $SO_2$.)

In spite of the fact that there was 1.88 wt.% $SO_2$ and 0.72 wt.% $H_2SO_4$ in the overall mixture, the solution pH was still maintained at 5.9 by the action of the buffer. Measurements of normality showed that the buffered water phase had a greater absorption capacity than that of the TEP phase. The high absorption capacity together with the high selectivity of the buffered water phase makes it a very useful absorbent to be used in a trim section or a second absorption zone, following bulk $SO_2$ removal by TEP absorption, to remove residual $SO_2$ from a gas stream after sulfur dioxide absorption by the TEP phase.

The above examples illustrate that a trialkyl phosphate solvent, particularly triethyl phosphate, when properly buffered exhibits a substantially reduced rate of degradative hydrolysis and of heat stable salt, particularly sulfate salt, formation. The examples also show that an aqueous solution of buffering agent is a selective solvent for $SO_2$, which may be regenerated by conventional methods.

The discovery that the buffering agents are themselves immiscible with TAP solvents when employed at greater than about 2 wt.% and thus, upon acidification, separate into a major volume (about 85%) TAP-water phase and a minor volume (about 15%) buffer-water phase lead to the development of the novel absorption-regeneration method previously described.

Although the invention has been described in terms of its preferred embodiments, those of ordinary skill in the art may, after a study of this disclosure, make modification or changes therein without departing from the scope and spirit of the invention as described above or claimed hereafter.

We claim:

1. A buffered degradation resistant sulfur dioxide absorption solvent, comprising:
   a water soluble trialkyl phosphate containing at least about five (5) percent by weight water in admixture with a buffering agent selected from the group consisting of alkanolaminium carboxylates, alkali metal salts of carboxylic acids or benzoic acid, and ammonium salts of carboxylic acids or benzoic acid.

2. The solvent of claim 1, wherein the trialkyl phosphate is a lower alkyl having alkyl groups of from one to about four carbon atoms.

3. The solvent of claim 1, wherein the trialkyl phosphate is triethyphosphate.

4. The solvent of claim 1, wherein the buffering agent is a sodium or potassium salt of a $C_1$ to $C_5$ carboxylic acid.

5. The solvent of claim 2, wherein the trialkyl phosphate and the buffering agent is sodium or potassium acetate.

6. The solvent of claim 2, wherein the buffering agent is sodium or potassium benzoate.

7. The solvent of claim 2, wherein the buffering agent is ammonium acetate or ammonium benzoate.

8. The solvent of claim 2, wherein the trialkyl phosphate is triethyl phosphate and the buffering agent is methyldiethanolaminium acetate or triethanolaminium acetate.

9. The solvent of claim 1, wherein the buffering agent is an alkanolaminium carboxylate of the following formula:

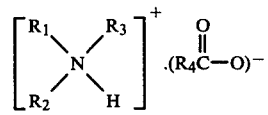

wherein $R_4$ is a lower alkyl having from one to four carbon atoms and $R_1$, $R_2$ and $R_3$ each independently represents hydrogen or a lower alkyl or a hydroxalkyl having from one to four carbon atoms.

10. A process for reducing degradation of a trialkyl phosphate preferential sulfur dioxide absorption solvent while such solvent is loaded with absorbed sulfur dioxide, comprising the steps of co-mingling with said solvent a buffering agent selected from the group consisting of alkanolaminium carboxylates, alkali metal salts of carboxylic acids or benzoic acid, and ammonium salts of carboxylic acids or benzoic acid; and maintaining said buffering agent in contact with said solvent until absorbed sulfur dioxide is removed therefrom.

11. The process of claim 10, wherein the buffering agent is an alkanolaminium carboxylate of the following formula:

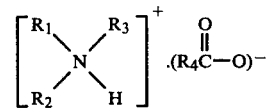

wherein $R_4$ is a lower alkyl having from one to four carbon atoms and $R_1$, $R_2$ and $R_3$ each independently represents hydrogen or a lower alkyl or a hydroxalkyl having from one to four carbon atoms.

12. The process of claim 10, wherein the buffering agent is a sodium or potassium salt of a $C_1$ to $C_5$ carboxylic acid.

13. The process of claim 12, wherein the trialkyl phosphate and the buffering agent is sodium or potassium acetate.

14. The process of claim 12, wherein the buffering agent is sodium or potassium benzoate.

15. The process of claim 12, wherein the buffering agent is ammonium acetate or ammonium benzoate.

16. The process of claim 10, wherein the preferential sulfur dioxide absorption solvent is a water soluble trialkyl phosphate is a lower alkyl having alkyl groups of from one to about four carbon atoms and the solvent contains at least about five (5%) percent by weight water.

17. The process of claim 16, wherein the trialkyl phosphate is triethyl phosphate.

18. The process of claim 17, wherein the buffering agent is methyldiethanolaminium acetate or triethanolaminium acetate.

* * * * *